United States Patent [19]
Chew et al.

[11] Patent Number: 5,734,840
[45] Date of Patent: Mar. 31, 1998

[54] PCI AND EXPANSION BUS RISER CARD

[75] Inventors: Paul Frank Chew, Boca Raton, Fla.; Thi H. N. Dang; Howard Jeffrey Locker, both of Cary, N.C.

[73] Assignee: International Business Machines Corporation, Armonk, N.Y.

[21] Appl. No.: 516,765

[22] Filed: Aug. 18, 1995

[51] Int. Cl.$^6$ .................................................. G06F 13/00
[52] U.S. Cl. ............................................................ 395/282
[58] Field of Search ................................. 395/281, 282; 361/686, 733, 683

[56] References Cited

U.S. PATENT DOCUMENTS

| | | | |
|---|---|---|---|
| 4,933,845 | 6/1990 | Hayes | 364/200 |
| 4,979,097 | 12/1990 | Triolo et al. | 364/200 |
| 5,109,517 | 4/1992 | Houda et al. | 395/800 |
| 5,113,500 | 5/1992 | Talbott et al. | 395/325 |
| 5,123,092 | 6/1992 | Buxton et al. | 395/250 |
| 5,138,703 | 8/1992 | Igarashi | 395/325 |
| 5,233,692 | 8/1993 | Gaijar et al. | 395/325 |
| 5,276,684 | 1/1994 | Pearson | 370/94.1 |
| 5,338,214 | 8/1994 | Steffes et al. | 439/160 |
| 5,406,453 | 4/1995 | Cusato et al. | 361/733 |
| 5,440,755 | 8/1995 | Harwer et al. | 395/800 |
| 5,481,681 | 1/1996 | Gallo et al. | 395/325 |
| 5,495,583 | 2/1996 | Townsend et al. | 395/282 |
| 5,499,341 | 3/1996 | Wilson et al. | 395/200.03 |
| 5,513,329 | 4/1996 | Pecone | 395/281 |
| 5,544,006 | 8/1996 | Radloff et al. | 361/683 |
| 5,594,621 | 1/1997 | van Rumpt | 361/686 |
| 5,604,871 | 2/1997 | Pecone | 395/281 |
| 5,611,057 | 3/1997 | Pecone et al. | 395/282 |
| 5,632,029 | 5/1997 | Bruce et al. | 395/500 |

FOREIGN PATENT DOCUMENTS

| | | |
|---|---|---|
| 463775 | 1/1992 | European Pat. Off. |
| 9309503 | 10/1992 | WIPO |

*Primary Examiner*—Ayaz R. Sheikh
*Attorney, Agent, or Firm*—Anthony N. Magistrale

[57] ABSTRACT

This disclosure relates to a computer system having a peripheral component interconnect (PCI) and expansion bus riser card having at least one expansion bus slot and at least one PCI slot, the latter of which meets a PCI bus stub length requirement. The PCI slot is connected to the PCI bus by a plurality of PCI stub lines. Each of the plurality of PCI lines does not exceed a predetermined length. The expansion bus is divided into a first section having a first plurality of lines and a second section having a second plurality of lines. The plurality of PCI lines are disposed between the first and second plurality of lines of the expansion bus such that all of the plurality of PCI lines from the riser card to the PCI bus do not exceed the predetermined length.

18 Claims, 7 Drawing Sheets

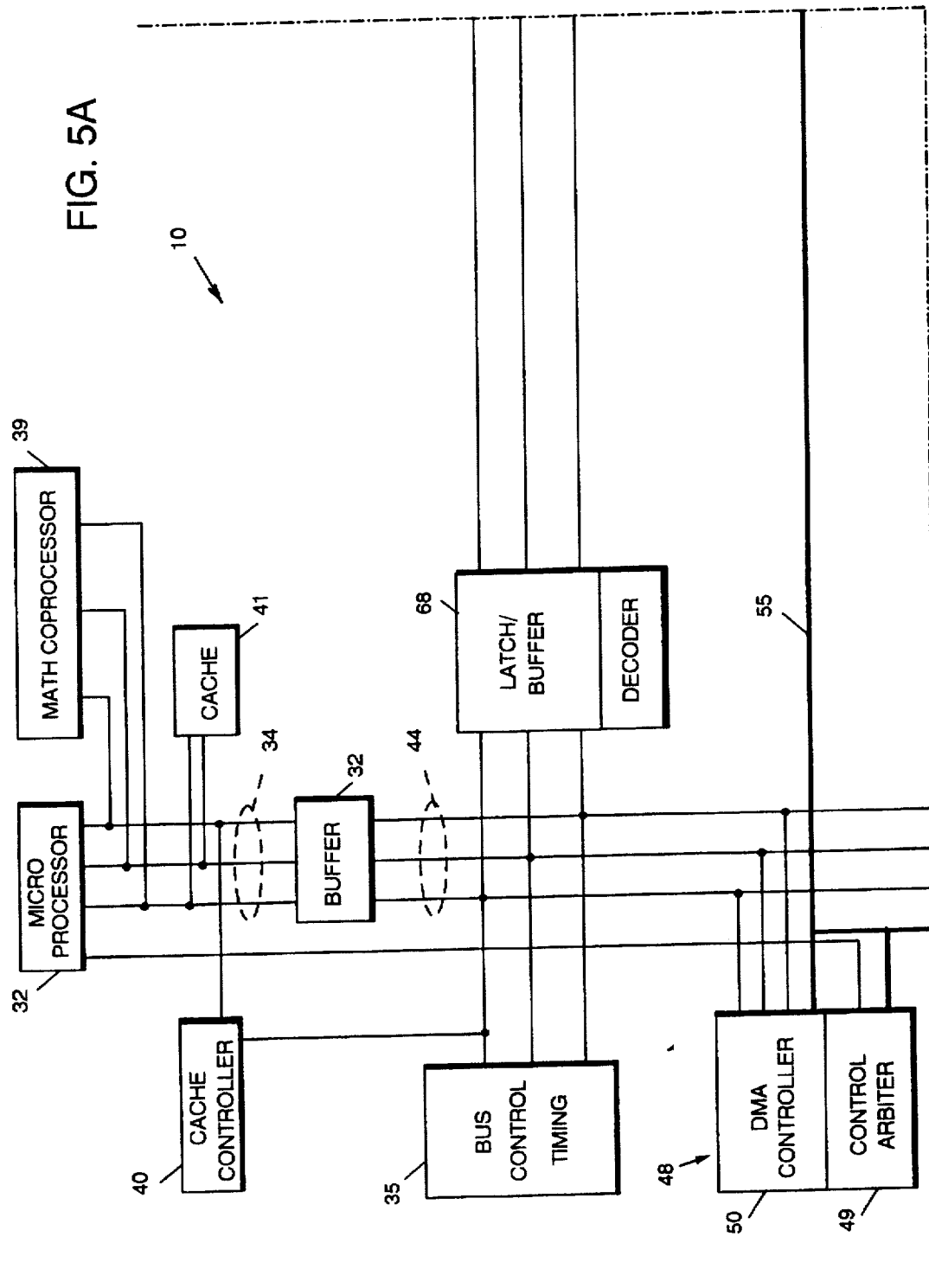

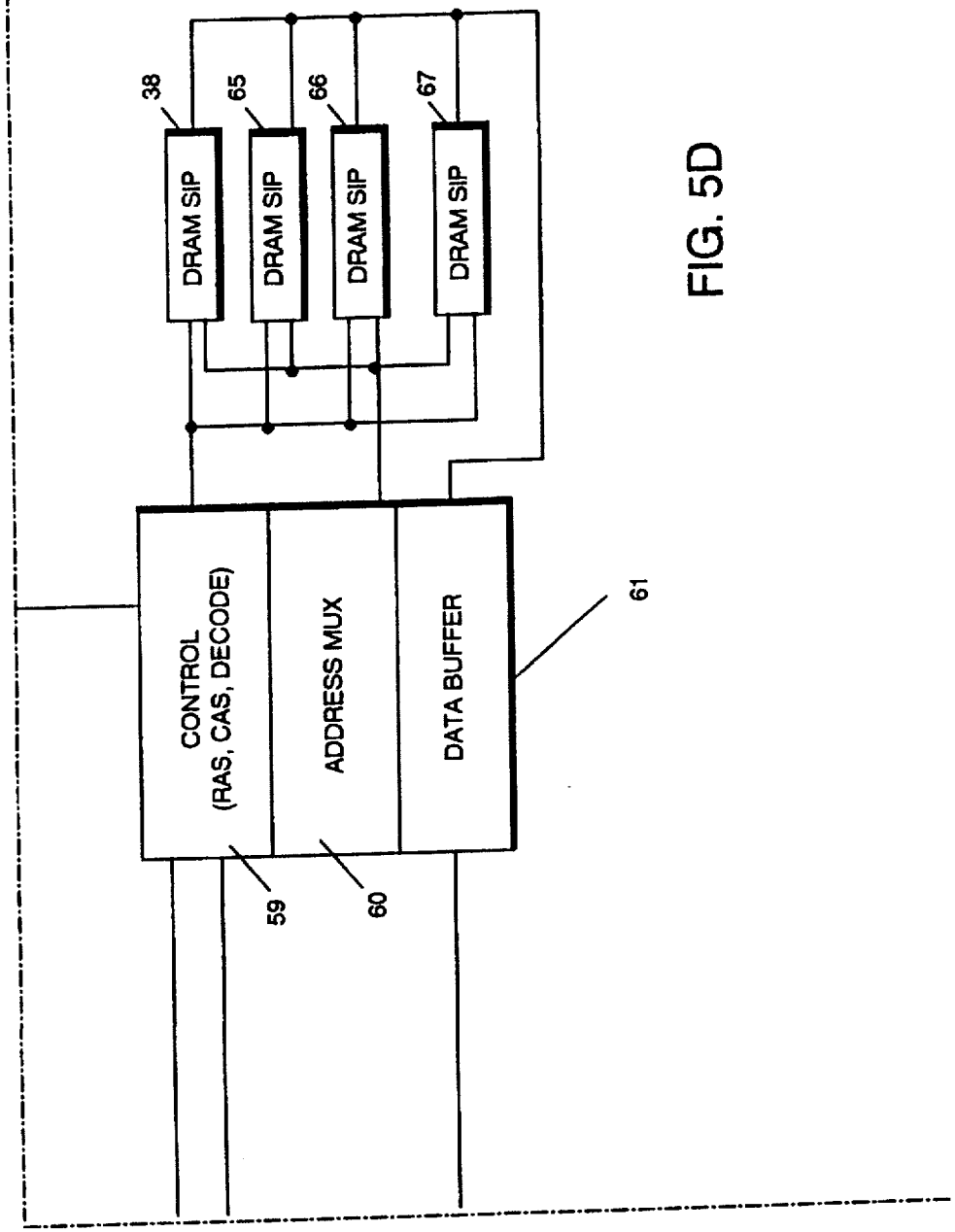

PCI AND EXPANSION BUS RISER CARD

BACKGROUND OF THE INVENTION

1. Field of the Invention

The present invention relates generally to personal computer systems and, more specifically, to a computer system having a peripheral component interconnect (PCI) and expansion bus riser card having at least one expansion bus slot and at least one PCI slot, the latter of which meets a PCI stub length requirement.

2. Description of Related Art

Personal computer systems are well known in the art. Personal computer systems in general, and IBM Personal Computers in particular, have attained widespread use for providing computer power to many segments of today's modern society. Personal computers can typically be defined as a desktop, floor standing, or portable microcomputer that is comprised of a system unit having a single central processing unit (CPU) and associated volatile and non-volatile memory, including all RAM and BIOS ROM, a system monitor, a keyboard, one or more flexible diskette drives, a fixed disk storage drive (also known as a "hard drive"), a "mouse" pointing device, and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are IBM's Personal Computer AT and IBM's Aptiva.

Personal computer systems are typically used to run software to perform such diverse activities as word processing, manipulation of data via spread-sheets, collection and relation of data in databases, displays of graphics, design of electrical or mechanical systems using system-design software, etc.

Graphics oriented operating system such as IBM's Operating System/2 (OS/2) and Microsoft's Windows have created a data bottleneck between the processor and its display peripherals in standard PC I/O architectures. Substantial performance gains are seen with graphical user interfaces (GUIs) and other high bandwidth functions (i.e., full motion video, small computer system interface (SCSI), local area network (LAN), etc.) when a "local bus" design is used. The peripheral component interconnect (PCI) bus has been defined with the primary goal of establishing an industry standard, high performance local bus architecture that offers low cost and allows differentiation. The PCI local bus is a high performance, high frequency (33 Mhz), 32-bit or 64-bit bus with multiplexed address and data lines. It is intended for use as an interconnect mechanism between highly integrated peripheral controller components, peripheral add-in boards, and processor/memory systems.

The PCI component and add-in card interface is processor independent, enabling an efficient transition to future processor generations and use with multiple processor architectures. Processor independence allows the PCI local bus to be optimized for I/O functions, enables concurrent operation of the local bus with the processor/memory subsystem, and accommodates multiple high performance peripherals in addition to graphics (motion video, LAN, SCSI, fiber distributed data interface (FDDI), hard disc drives, etc.). Movement to enhanced video and multimedia displays (i.e., high definition television (HDTV) and 3-dimensional) and other high bandwidth I/O will continue to increase local bus bandwidth requirements. A transparent 64-bit extension of the 32-bit data and address buses is defined, doubling the bus bandwidth and offering forward and backwards compatibility of 32-bit and 64-bit PCI local bus peripherals.

Referring to FIG. 1, the PCI bus specifications require the concept of a "speedway" bus 10. In other words, the PCI bus 10 is made up of shared signal traces, allowing PCI devices to be connected to appropriate signals through stubs 12 of minimal length. In order to meet loading parameters and due to the frequencies involved, the PCI bus 10 requires that all signal wires 12 from a PCI device 14, 16 or 18, for example, to the PCI bus 10 must have a stub length of less than 1.5 inches. For PCI components on the planar it is not difficult to meet this requirement. However, a problem arises when adding a riser card which supports PCI expansion slots.

Turning to FIG. 2 there is shown a prior art solution for video electronics standards association (VESA) and other multiple buses on a single riser card 20 having an industry standard architecture (ISA) slot (or Micro Channel (MC) slot) 22 and a PCI slot 24. An expansion bus or PCI bus adapter (or add-on) card can be inserted in the slots 22 and 24 respectively for connecting the expansion bus or PCI bus to the add on cards or devices. The solution is to simply add the additional bus (PCI bus 26) to the end of the first bus (ISA or Micro Channel bus 28) on the planar (not shown). The PCI slot 24 is connected to the PCI bus 26 on the planar by a plurality of lines 30 (typically 32 lines for a 32-bit PCI bus or 64 lines for a 64-bit PCI bus). By adding the PCI bus 26 to the end of the expansion bus (ISA or MC) 28, although some of lines 30, for example line 30-$a$ will meet the stub length requirement most of the lines, as represented by for example line 30-$b$ will not meet the 1.5" requirement.

It is therefore desirable to provide a wiring scheme for connecting a planar and a PCI and expansion bus riser card to meet the PCI bus stub length requirement.

SUMMARY OF THE INVENTION

The present invention is directed to a computer system having a peripheral component interconnect (PCI) and expansion bus riser card having at least one expansion bus slot and at least one PCI slot, the latter of which meets a PCI bus stub length requirement. The system of the present invention includes a high speed microprocessor coupled to a high speed data bus. A bus controller is coupled to the high speed data bus and a slower speed data bus for providing communications between the high speed data bus and the slower speed data bus. A buffer is coupled to the slower speed data bus and an expansion bus for providing an interface therebetween. The expansion bus includes a plurality of slots for receiving circuit boards therein. A riser card is connected to one of the plurality of slots of the expansion bus and a PCI bus.

The riser card includes at least one expansion bus slot for connecting expansion bus adapter card(s) to the expansion bus and at least one PCI slot for connecting PCI adapter card(s) to the PCI bus. The PCI slot is connected to the PCI bus by a plurality of PCI stub lines. Each of the plurality of PCI lines does not exceed a predetermined length. The expansion bus is disposed between the PCI bus such that all of the plurality of PCI lines from the riser card to the PCI bus do not exceed the predetermined length.

In order to allow all of the PCI stub lines to be within the predetermined length, the expansion bus is divided into two sections. The first section includes a first plurality of lines and the second section includes a second plurality of lines such that the signals for the expansion bus are placed on both sides of the plurality of PCI lines. In other words, the plurality of PCI lines are placed (sandwiched) between the first and second plurality of lines of the expansion bus.

Although it is preferred that the number of lines contained in the first and second sections of the expansion bus be equal to one-half of the total expansion bus lines, this is not important so long as all of the PCI connector lines can be coupled to the PCI bus and remain within the 1.5 inch requirement. For example, the PCI bus can have 64 lines (comprising data, address and control lines) and the expansion bus can be an ISA bus also having 64 lines. Although it is preferable to have 32 lines in the first ISA bus section and 32 lines in the second ISA bus section, the split for the two sections can be any number which adds up to 64 (e.g., section one has 22 lines while section two has 42 lines) provided that all of the 64 PCI lines connecting the PCI slot of the riser card to the PCI bus are less than the stub length requirement of 1.5 inches.

DETAILED DESCRIPTION OF THE INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 3:
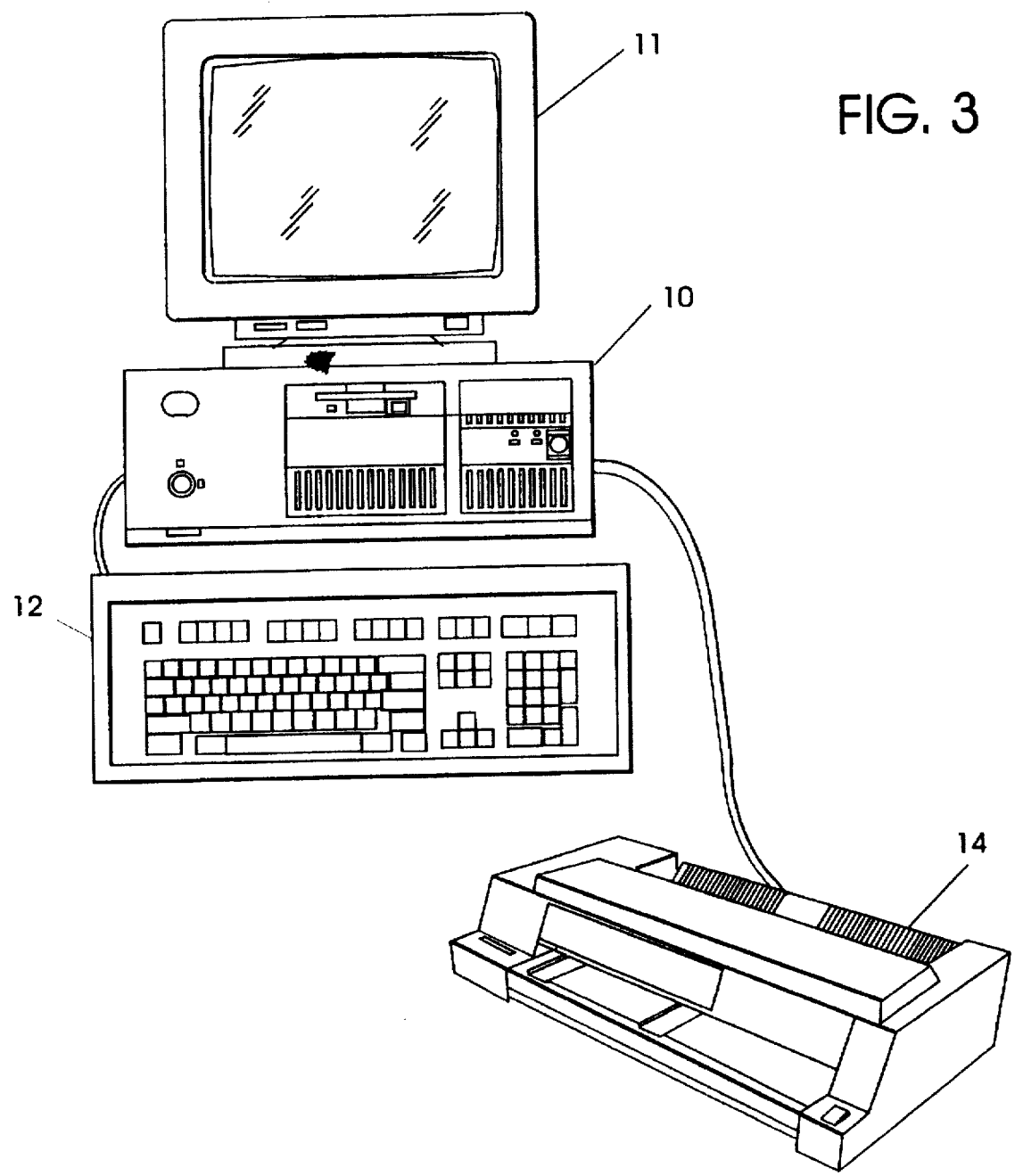
FIG. 3 is a perspective view of a personal computer embodying this invention.

Referring now more particularly to the accompanying drawings, a microcomputer embodying the present invention is there shown and generally indicated at 10 (FIG. 3). As mentioned hereinabove, the computer 10 may have an associated monitor 11, keyboard 12 and printer or plotter 14. The computer 10 has a cover 15 formed by a decorative outer member 16 (FIG. 4) and an inner shield member 18 which cooperate with a chassis 19 in defining an enclosed, shielded volume for receiving electrically powered data processing and storage components for processing and storing digital data. At least certain of these components are mounted on a planar 20 which is mounted on the chassis 19 and provides a means for electrically interconnecting the components of the computer 10 including those identified above and such other associated elements as floppy disk drives, various forms of direct access storage devices, accessory cards or boards, and the like.

Figure 4:
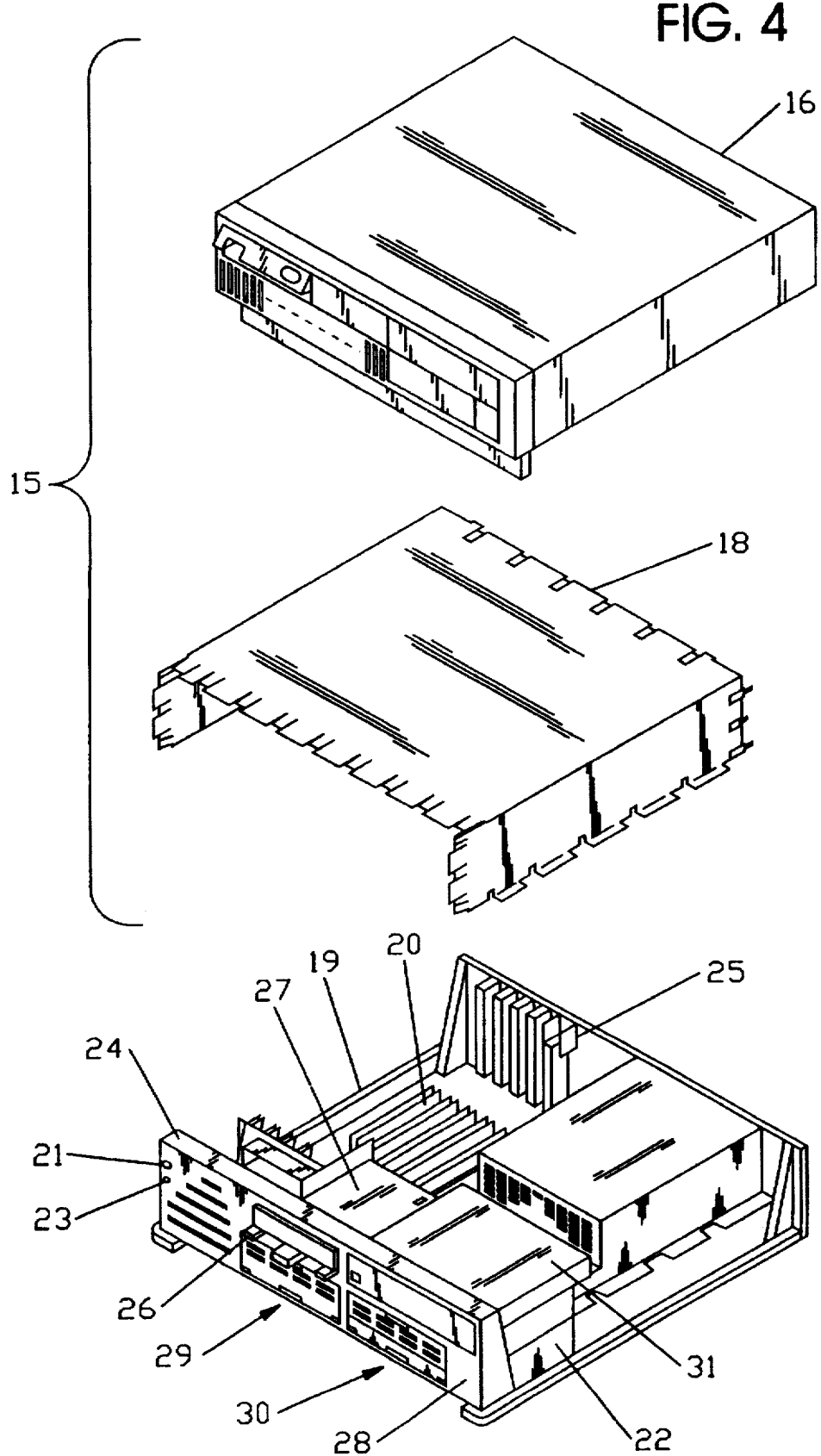
FIG. 4 is an exploded perspective view of certain elements of the personal computer of FIG. 1 including a chassis, a cover, an electromechanical direct access storage device and a planar board, and illustrating certain relationships among those elements.

The chassis 19 has a base indicated at 22, a front panel indicated at 24, and a rear panel indicated at 25 (FIG. 4). The front panel 24 defines at least one open bay (and in the form illustrated, four bays) for receiving a data storage device such as a disk drive for magnetic or optical disks, a tape backup drive, or the like. In the illustrated form, a pair of upper bays 26, 28 and a pair of lower bays 29, 30 are provided. One of the upper bays 26 is adapted to receive peripheral drives of a first size (such as those known as 3.5 inch drives) while the other 28 is adapted to receive drives of a selected one of two sizes (such as 3.5 and 5.25 inch) and the lower bays are adapted to receive devices of only one size (3.5 inch). One floppy disk drive is indicated at 27 in FIG. 4, and can be a removable medium direct access storage device capable of receiving a diskette inserted thereinto and using the diskette to receive, store and deliver data as is generally known. One hard disk drive is indicated at 31 and is a fixed medium direct access storage device capable of storing and delivering data as is generally known.

Figure 5B:
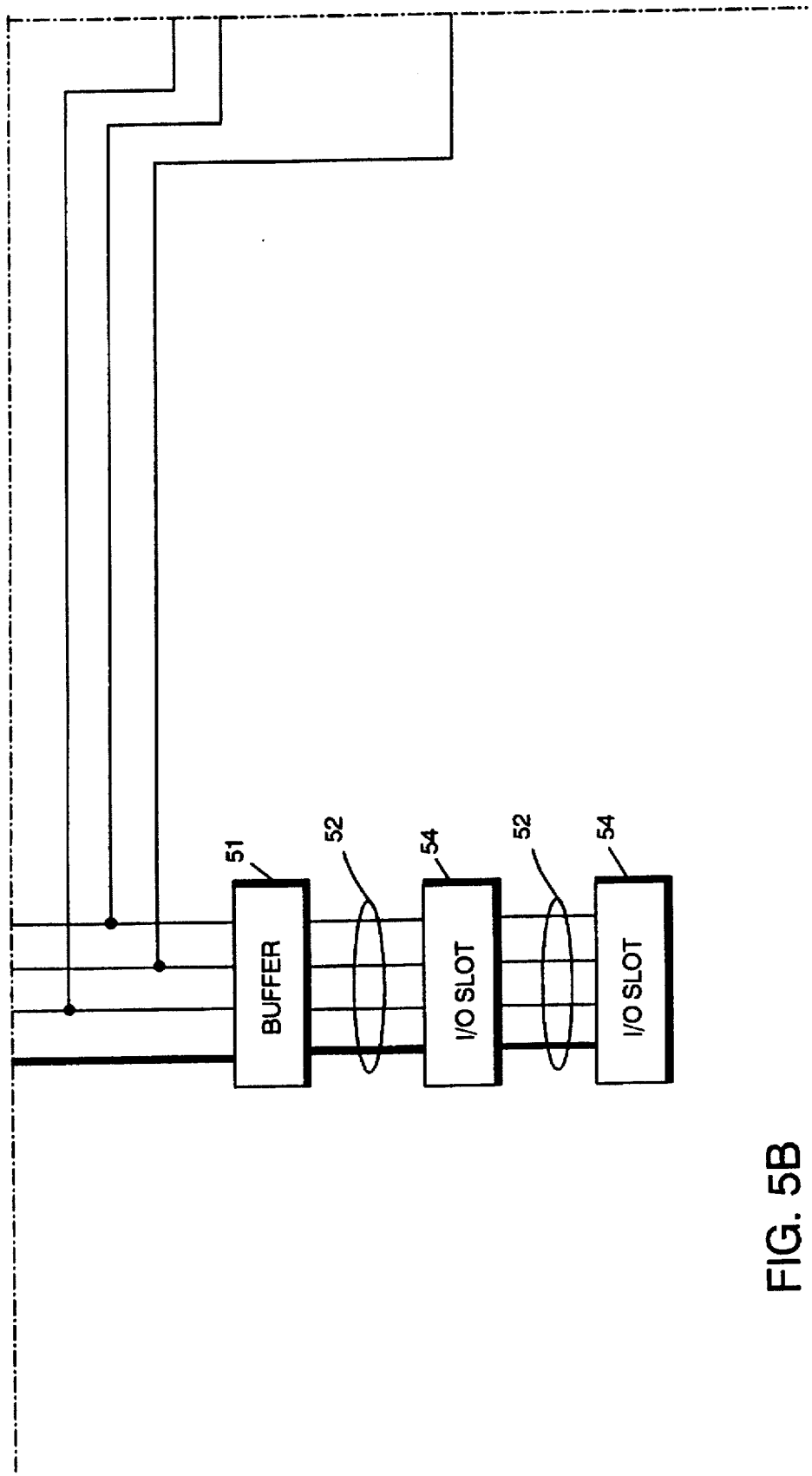
FIG. 5 is a block diagram of certain components of the personal computer of FIGS. 1 and 2.
Figure 5C:
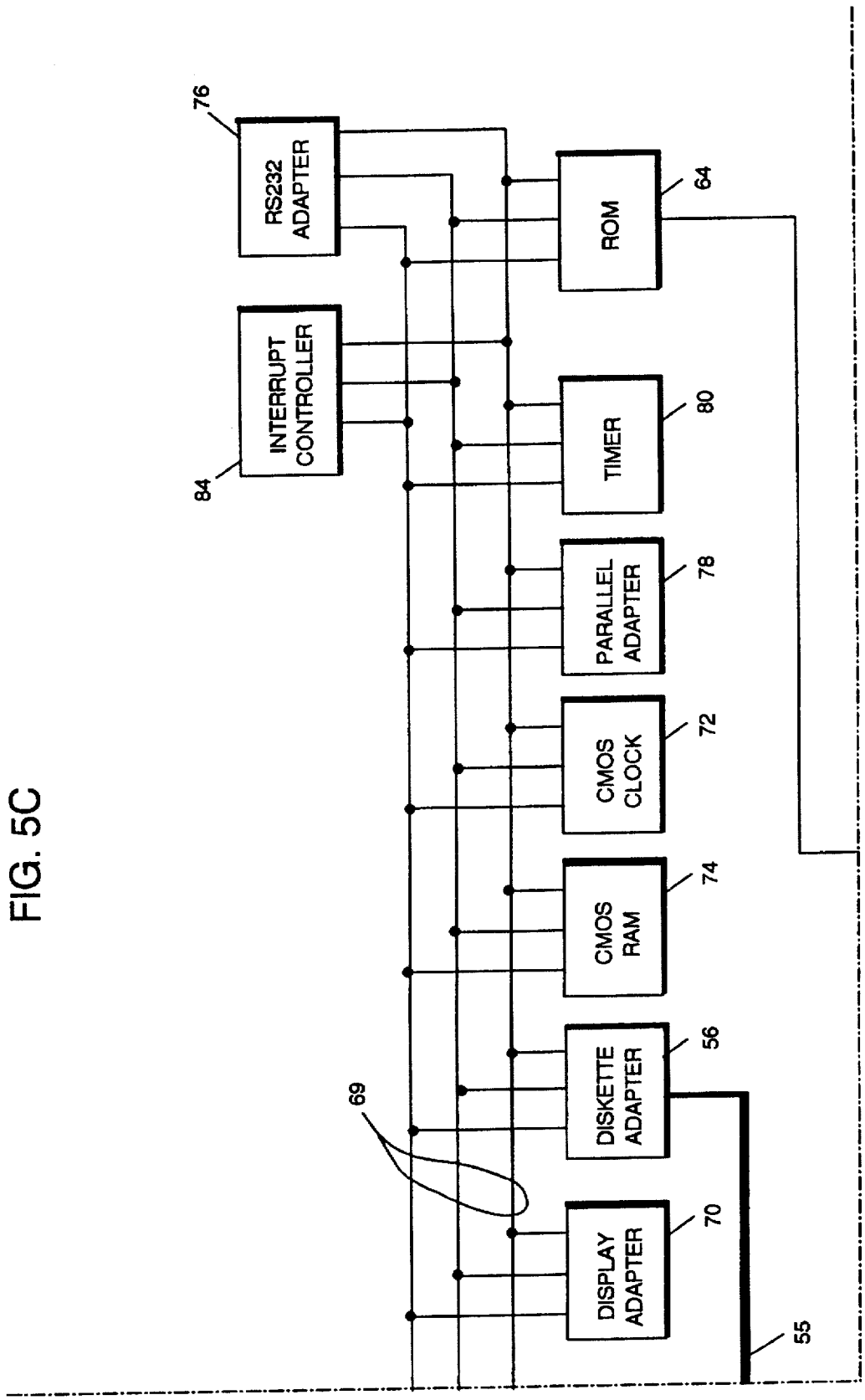

Prior to relating the above structure to the present invention, a summary of the operation in general of the personal computer system 10 may merit review. Referring to FIG. 5, there is shown a block diagram of a personal computer system illustrating the various components of the computer system 10 in accordance with the present invention. FIG. 5 further illustrates components mounted on the planar 20 and the connection of the planar to the I/O slots and other hardware of the personal computer system 10. Connected to the planar is the system processor 32 comprised of a microprocessor which is connected by a high speed CPU local bus 34 through a bus control timing unit 35 to a memory control unit 36 which is further connected to a volatile random access memory (RAM) 38. While any appropriate microprocessor can be used, one suitable microprocessor is the Pentium processor which is sold by Intel.

While the present invention is described hereinafter with particular reference to the system block diagram of FIG. 5, it is to be understood at the outset of the description which follows that it is contemplated that the apparatus and methods in accordance with the present invention may be used with other hardware configurations of the planar board. For example, the system processor could be an Intel 80486 or Pentium microprocessor.

Returning now to FIG. 5, the CPU local bus 34 (comprising data, address and control components) provides for the connection of the microprocessor 32, a math coprocessor 39, a cache controller 40, and a cache memory 41. Also coupled on the CPU local bus 34 is a buffer 42. The buffer 42 is itself connected to a slower speed (compared to the CPU local bus) system bus 44, also comprising address, data and control components. The system bus 44 extends between the buffer 42 and a further buffer 51. The system bus 44 is further connected to a bus control and timing unit 35 and a DMA unit 48. The DMA unit 48 is comprised of a central arbitration unit 49 and DMA controller 50. The buffer 51 provides an interface between the system bus 44 and an optional feature or expansion bus such as a Micro Channel or industry standard architecture (ISA) bus 52. Connected to the bus 52 are a plurality of I/O slots 54 for receiving Micro Channel (ISA) adapter cards or multiple bus adapter cards such as riser card 100 (shown in FIG. 6) which may be further connected to an I/O or peripheral device or memory.

An arbitration control bus 55 couples the DMA controller 50 and central arbitration unit 49 to the I/O slots 54 and a diskette adapter 56. Also connected to the system bus 44 is a memory control unit 36 which is comprised of a memory controller 59, an address multiplexer 60, and a data buffer 61. The memory control unit 36 is further connected to a random access memory as represented by the RAM module 38. The memory controller 36 includes the logic for mapping addresses to and from the microprocessor 32 to particular areas of RAM 38. This logic can be used to reclaim RAM previously occupied by BIOS. Further generated by memory controller 36 is a ROM select signal (ROMSEL), that is used to enable or disable ROM 64.

While the microcomputer system 10 is shown with a basic one megabyte RAM module 38, it is understood that additional memory can be interconnected as represented in FIG. 5 by the optional memory modules 65 through 67. For purposes of illustration only, the present invention is described with reference to the basic one megabyte memory module 38.

A latch buffer 68 and an associated decoder are coupled between the system bus 44 and a planar I/O bus 69. The planar I/O bus 69 includes address, data, and control components respectively. Coupled along the planar bus 69 are a variety of I/O adapters and other components such as the display adapter 70 (which is used to drive the monitor 11), a CMOS or real time clock (RTC) 72, nonvolatile CMOS RAM 74 herein after referred to as NVRAM, a RS232 adapter 76, a parallel adapter 78, a timer 80, a diskette adapter 56, a programmable interrupt controller (PIC) 84, and a read only memory 64. The read only memory 64 includes the BIOS that is used to interface between the I/O devices and the operating system of the microprocessor 32. The BIOS includes diagnostic routines which are contained in a power on self test section referred to as POST and is used to test the major components of the personal computer system 10. BIOS stored in ROM 64 can be copied into RAM 38 to decrease the execution time of BIOS. ROM 64 is further responsive (via ROMSEL signal) to memory controller 36. If ROM 64 is enabled by memory controller 36, BIOS is executed out of ROM. If ROM 64 is disabled by memory controller 36, ROM is not responsive to address enquiries from the microprocessor 32 (i.e. BIOS is executed out of RAM).

The real time clock 72 is used for time of day calculations and includes registers and locations which are well known to those of ordinary skill in the art of the present invention.

NVRAM 74 is used to store system configuration data. That is, the NVRAM 74 will contain values which describe the present configuration of the system. For example, NVRAM 74 contains information describing the capacity of a fixed disk or diskette, the type of display, the amount of memory, etc. Of particular importance NVRAM 74 will contain data (can be one bit) which is used by the memory controller 36 to determine whether BIOS is run out of ROM or RAM and whether to reclaim RAM intended to be used by BIOS RAM. Furthermore, these data are stored in NVRAM 74 whenever a special configuration program, such as SET Configuration, is executed. The purpose of the SET Configuration program is to store values characterizing the configuration of this system to NVRAM 74 which are saved when power is removed from the system.

Figure 1:
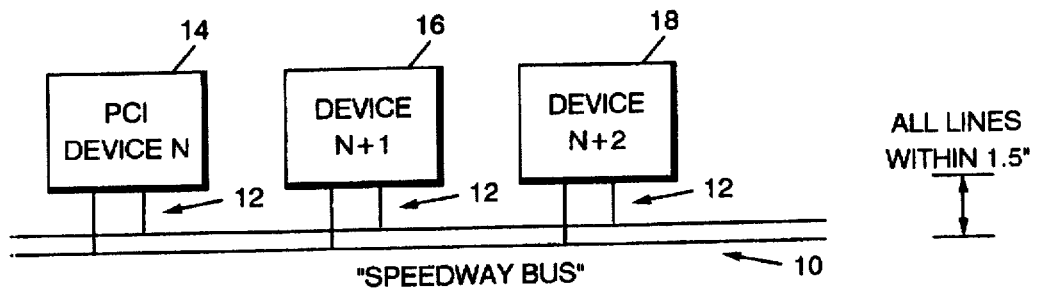
FIGS. 1 illustrates a PCI bus specification requiring a stub length of 1.5 inches.
Figure 2:
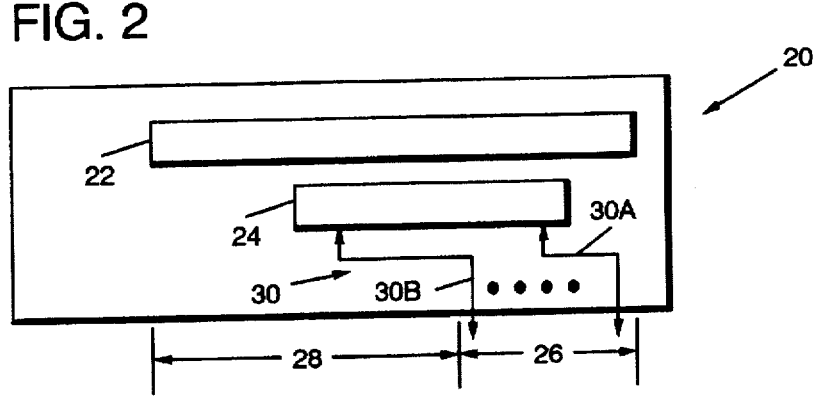
FIG. 2 is a block diagram of a prior art wiring scheme for connecting an expansion bus riser card to multiple buses.
Figure 6:
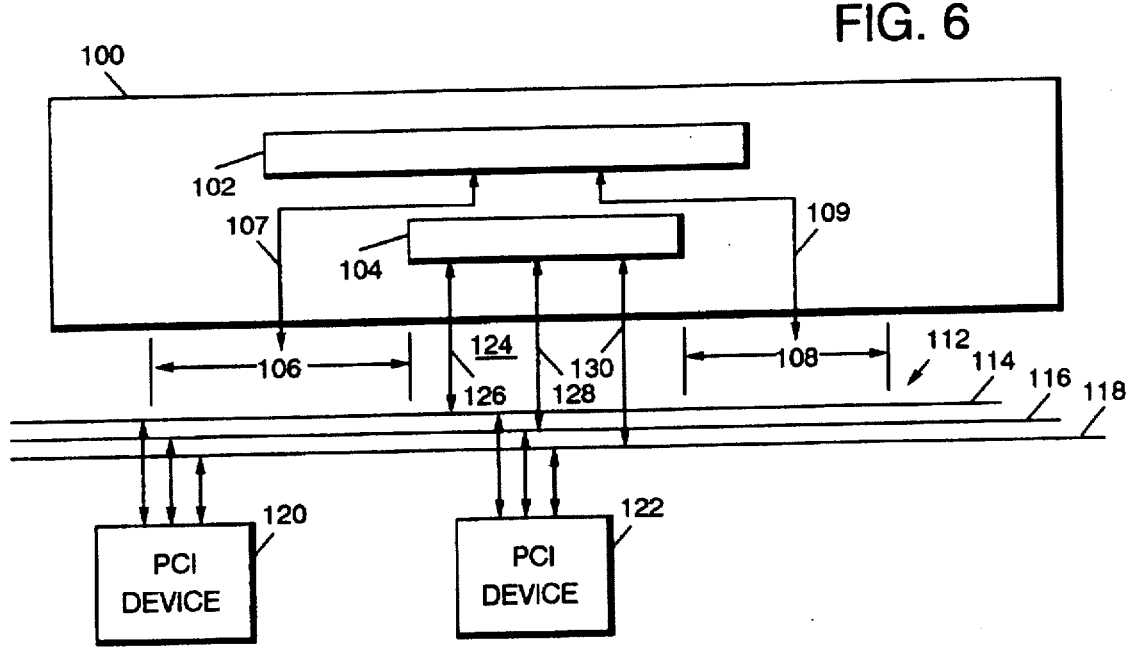
FIG. 6 is a schematic diagram of a wiring scheme for connecting a PCI and expansion bus riser card to a PCI and expansion bus respectively, in accordance with the present invention.

The present invention is directed to a PCI and expansion bus riser card wiring scheme which meets the PCI bus stub length requirement of 1.5 inches. Referring to FIG. 6, there is shown a riser card 100 coupled to one of I/O slots 54 (FIG. 5). Typically, this connection is made by way of a male/female connection. The riser card 100 contains an expansion bus slot 102 and a PCI slot 104. The expansion bus slot 102 will accept expansion bus (e.g., Micro Channel or ISA) adapter cards while the PCI slot 104 can accept PCI adapter cards. A PCI bus 112 includes data lines 114, address lines 116 and control lines 118. Various PCI devices can be connected to the PCI bus 112. For illustrative purposes two PCI devices 120 and 122 are shown connected to the PCI bus 112, as shown in FIG. 6.

The PCI slot 104 is connected to the PCI bus 112 via PCI stub lines 124 which include data 126, address 128 and control lines 130. In order to meet the PCI stub length requirement, each of the PCI stub lines 124 are directly connected to the corresponding data, address and control lines of the PCI bus 112. In other words, each of lines 124 (regardless of whether there are 32 or 64 lines corresponding to a 32 bit or 64 bit PCI bus 112) are less than the stub length requirement of 1.5 inches. Each of lines 124 are preferably straight, parallel to each other and perpendicular to the PCI bus lines 112. In order to allow all of lines 124 to be within the required length, the expansion bus 52 is divided into two parts, a first part 106 and a second part 108 such that the signals for the expansion bus 52 are placed on both sides of the lines 124. In other words, the 32 or 64 lines 124 are placed in between the lines 106, 108 of the expansion bus 52. The expansion bus slot 102 is connected to expansion bus parts 106 and 108 via lines 107 and 109, respectively. The lines 107 and 109 include data, address and control lines which correspond to data, address and control lines of expansion bus parts 106 and 108.

Although it is preferred that the number of lines contained in the first and second parts 106 and 108 respectively of the expansion bus be equal to one-half of the total expansion bus lines, this is not important so long as all of the PCI stub lines 124 can be coupled to the PCI bus 112 and remain within the 1.5 inch requirement. For example, if the expansion bus 52 contained 64 total lines, although it is preferable to have 32 lines in part one 106 and 32 lines in part two 108, the split for the two parts can be any number which adds up to 64 (e.g., part one 106 has 22 lines while part two 108 contains 42 lines) provided that all of the PCI lines 124 can reach the PCI bus 112 and remain within 1.5 inches. It should be understood that the number of expansion slot connector lines 107 and 109 will correspond to the number of lines of the first and second expansion bus parts 106 and 108, respectively.

The industry expansion bus 52 comprised of parts 106 and 108 can be for example, either a Micro Channel bus or an industry standard architecture (ISA) bus. Accordingly, the expansion slot 102 would be a Micro Channel or ISA expansion slot for receiving Micro Channel or ISA adapter cards respectively.

It should be understood that although the riser card 100 was described with regard to one expansion bus (e.g., Micro Channel or ISA) slot and one PCI slot there can be any number of expansion bus and PCI slots subject to physical limitations. For example, there can be three expansion bus slots and two PCI slots.

The PCI and expansion bus riser card of the present invention thus provides several advantages including a simple and cost effective wiring of a planar and riser card to meet the PCI stub length requirements. This wiring scheme can be done with existing physical design and connector technology and it follows PCI guidelines for PCI devices. In addition, this wiring scheme can be used for any industry bus and PCI mixed riser card.

While the invention has been particularly shown and described with respect to preferred embodiments thereof, it should be understood by those skilled in the art that the foregoing and other changes in form and detail may be made therein without departing from the spirit and scope of the invention as defined in the appended claims.

What is claimed is:

1. A PCI and expansion bus apparatus comprising:

an expansion bus disposed within a planar board and having a plurality of slots for receiving circuit boards therein, a PCI bus disposed within said planar board and having at least one slot for receiving PCI circuit boards therein, a riser card connected to one of said plurality of slots of said expansion bus and said at least one PCI slot, said riser card including:

at least one expansion bus slot for connecting an expansion adapter card to said expansion bus, at least one PCI slot for connecting a PCI adapter card to said PCI bus, said PCI slot being connected to said PCI bus on said planar by a first plurality of PCI lines, and wherein said expansion bus is disposed between said PCI bus such that each of the first plurality of PCI lines from said riser card to said PCI bus do not exceed a PCI bus stub length requirement.

2. The apparatus according to claim 1, wherein each of said first plurality of PCI lines are parallel to each other and are perpendicular to said PCI bus.

3. The apparatus according to claim 1, wherein said expansion bus is comprised of a first section having a first plurality of lines and a second section having a second plurality of lines, wherein said first plurality of PCI lines are sandwiched between said first and second sections of said expansion bus.

4. The apparatus according to claim 3, wherein said first plurality of lines comprises thirty two lines and said second plurality of lines comprises thirty two lines.

5. The apparatus according to claim 1, wherein said expansion bus is a Micro Channel bus.

6. The apparatus according to claim 1, wherein said expansion bus is an industry standard architecture (ISA) bus.

7. The apparatus according to claim 1, wherein said PCI stub length requirement is one and one-half inches.

8. The apparatus according to claim 1, wherein the riser card includes three expansion bus slots and two PCI slots, each of said two PCI slots being connected to said PCI bus by a plurality of PCI lines, wherein each of said plurality of PCI lines does not exceed said PCI stub length requirement.

9. The apparatus according to claim 1, further including at least one PCI device coupled to said PCI bus by a second plurality of PCI lines, wherein each of said second plurality of PCI lines does not exceed said PCI stub length requirement.

10. A personal computer system comprising:

a planar board comprising:

a high speed microprocessor coupled to a high speed data bus;

a bus controller coupled to said high speed data bus and an expansion bus for providing communications between the high speed data bus and the expansion bus, said expansion bus having a plurality of slots for receiving circuit boards therein, a PCI bus coupled to said microprocessor said PCI bus having at least one slot for receiving PCI circuit boards therein, a riser card connected to one of said plurality of slots of said expansion bus and said at least one PCI slot, said riser card having at least one expansion bus slot for connecting an expansion adapter card to said expansion bus and at least one PCI slot for connecting a PCI adapter card to said PCI bus, said PCI slot on said riser card being connected to said PCI bus on said planar by a first plurality of PCI lines, wherein said expansion bus is disposed between said PCI bus such that each of the first plurality of PCI lines from said riser card to said PCI bus do not exceed a PCI bus stub length requirement.

11. The system according to claim 10, wherein each of said first plurality of PCI lines are parallel to each other and are perpendicular to said PCI bus.

12. The system according to claim 10, wherein said expansion bus is comprised of a first section having a first plurality of lines and a second section having a second plurality of lines, wherein said first plurality of PCI lines are sandwiched between said first and second sections of said expansion bus.

13. The system according to claim 12, wherein said first plurality of lines comprises thirty two lines and said second plurality of lines comprises thirty two lines.

14. The system according to claim 10, wherein said expansion bus is a Micro Channel bus.

15. The system according to claim 10, wherein said expansion bus is an industry standard architecture (ISA) bus.

16. The system according to claim 10, wherein said PCI stub length requirement is one and one-half inches.

17. The system according to claim 10, wherein the riser card includes three expansion bus slots and two PCI slots, each of said two PCI slots being connected to said PCI bus by a plurality of PCI lines, wherein each of said plurality of PCI lines does not exceed said PCI stub length requirement.

18. The system according to claim 10, further including at least one PCI device coupled to said PCI device by a second plurality of PCI lines, wherein each of said second plurality of PCI lines does not exceed said PCI stub length requirement.

* * * * *